May 1, 1956  A. H. HEINRICH  2,743,948

ROTARY SEAL

Filed Oct. 24, 1952

INVENTOR.
August H. Heinrich
BY Bates, Teare & McBean
Attorneys

United States Patent Office 2,743,948
Patented May 1, 1956

2,743,948
ROTARY SEAL

August H. Heinrich, Euclid, Ohio, assignor to Metal Seal & Products, Inc., Cleveland, Ohio, a corporation of Ohio Application October 24, 1952, Serial No. 316,702

6 Claims. (Cl. 286—11)

This invention relates to fluid seals generally and more particularly to improvements in fluid seals for a rotating shaft.

The provision of a seal for a rotating shaft which extends outwardly from a fluid housing requires a consideration of overcoming the relative motion of the shaft and the sealing members as well as the displacement forces and wear of the cooperating sealing components. Optimum performance can be obtained by providing a relatively movable sealing assembly which coacts axially along the rotating shaft between the housing abutment and a member on the shaft to provide a fluid-tight seal. Some means, such as a resilient toroidal ring, may be provided between two axially spaced members tending to separate them against the housing abutment and the member on the shaft for coaction therewith to form a fluid-tight seal along the shaft and against the housing abutment. This arrangement is satisfactory for the usual fluid pressure system operating at normal temperatures, but because of the nature of the resilient ring material it is not suitable for a fluid pressure system operating in a high temperature environment.

Accordingly it is an object of this invention to provide an operating member for the sealing assembly which is resiliently flexible to provide the axial tension for sealing coaction with the other members and which also is not adversely affected by a high temperature environment.

A further object of this invention is to provide an improved sealing assembly for a rotating shaft which will better withstand the operating forces and conditions in any fluid pressure environment.

Briefly, in accordance with this invention, a rotating shaft which extends through a stationary abutment carries a relatively movable sealing assembly adapted to coact axially along the shaft between the abutment and a radially flexible member on the shaft to provide a fluid-tight seal therewith. The operating device which initiates and maintains the sealing coaction is in the form of resiliently flexible annular members having a bell-shaped configuration which are intended to telescope with each other in compressed relation between the abutment and the member on the shaft so as to coact therewith to engage and axially separate intermediate retaining members against the abutment and the radially flexible member on the shaft respectively. This axial coaction causes the radially flexible member to clamp against the shaft to effect a fluid seal therewith and also maintains a sealing and bearing contact with the abutment to prevent leakage of fluid therebetween.

Figure 1:
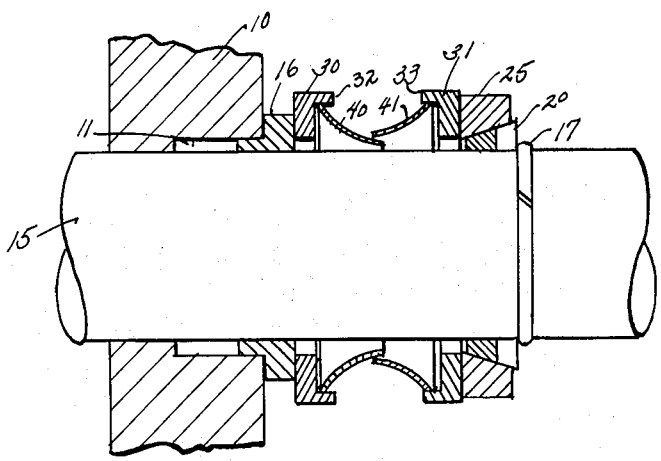
Fig. 1 illustrates in partial cross-section a preferred embodiment of the sealing assembly mounted along a shaft extending from a fluid housing wall.
Figures 2, 3, 4:
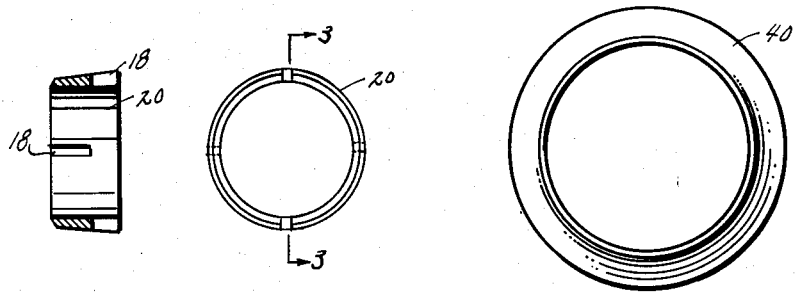
Fig. 2 is an end view of the radially flexible member that is carried on the shaft.
Fig. 3 is a view of the driving member taken along the lines 3—3 in Fig. 2.
Fig. 4 is an end or axial view of one of the bell-shaped operating members which initiates and maintains the sealing action of the assembly.

Referring now to Fig. 1 of the drawings, there is shown in section a portion of a fluid housing wall 10 having an opening 11 through which the rotating shaft 15 extends. An annular abutment 16 surrounds the shaft adjacent the housing wall 10 and has a portion extending into the opening 11 and engaging the wall by means of a press-fit or the like. A split ring 17 is keyed to the shaft 15 in axially spaced relation from the fixed abutment 16 to act as a limiting stop for the sealing assembly in the shaft in a manner to be hereinafter more fully described.

The driving member is in the form of a sleeve 20 which is freely supported on the shaft 15 intermediate the abutment and the split ring 17. This sleeve is provided with an external surface that is tapered axially in a manner rising away from the abutment 16 to present an axially extending wedge surface on the shaft. Radial flexibility is imparted to the sleeve 20 by providing longitudinal axial slots 18 alternating in opposite edges around the sleeve. The slots are preferably greater than one-half the axial length of the sleeve to enable the sleeve to be radially clamped to the shaft.

The assembly further includes an annular coupling member 25 which is freely disposed about the shaft intermediate the abutment 16 and the sleeve 20. The inner surface of the coupling member is also axially tapered in a manner complementary to the external tapered surface of the sleeve 20 and is adapted to telescope onto the sleeve 20 in wedging relation to radially clamp the sleeve against the shaft as hereinbefore described. The split ring 17 acts as a limiting stop on the shaft against which the wedging action takes place.

Intermediate the abutment 16 and the sub-assembly of the driving and coupling members there are shown two annular retaining members 30 and 31 which are freely supported in axial spaced relation on the shaft for relative movement between the abutment and the sub-assembly of the driving and coupling members. Each of the annular retaining members 30 and 31 is provided with a peripheral flange 32 and 33 respectively which extends in an axial direction and the members are so disposed on the shaft that the overhanging peripheral flanges are directed towards each other to provide a partial enclosure therebetween. These retaining members coact in the assembly to retain between them a pair of bell-shaped resiliently flexible sleeves 40 and 41 which are disposed about the shaft with their large diameters opposed to each other and their smaller diameters adapted to telescope within each other. The resiliently flexible sleeves 40 and 41 are preferably made of a sheet metal which can be resiliently flexed when compressed and which will return to its original configuration when released. The telescoping bell-shaped configuration of the ring surfaces is preferable but it will be apparent to those skilled in the art that other surface configurations may be utilized in the assembly to provide the desired axial tension. A desirable characteristic of the sleeve material is one that will enable it to withstand temperatures as high as 600° F. to 700° F. without adverse effect.

As best shown in Fig. 1 of the drawings, the large diameter end of each resilient sleeve 40 and 41 is accommodated within the peripheral flange of the corresponding retaining member so that the outwardly flaring edge of each resilient sleeve engages the inner surface of the corresponding peripheral flange. The outwardly flaring edges of the large diameter ends of the sleeves are preferably connected to the engaging inner surface of the corresponding peripheral flange by means of a mechanical connection. This connection may be accomplished by a union of the metallic members or by means of a suitable coupling such as interlocking lugs and recesses respectively on the peripheral edges of the sleeves and retaining members. It is readily apparent that by telescoping the small diameter ends of the flexible sleeves 40 and 41 in this assembly the axial surfaces can be tensioned to react against and spread the retaining members axially apart and against the abutment 16 and the coupling member 25 respectively. As the shaft rotates, centrifugal force acting on these resilient sleeves will tend to enhance the axial tension.

The retaining member 31, which is adjacent the coupling member 25, responds to the tension by pressing against the coupling member 25 to wedge it axially against the mating tapered surface of the driving sleeve 20, thereby compressing and clamping the driving sleeve against the shaft to effect a fluid seal therewith. The other retaining member 30, which is adjacent the abutment 16, coacts therewith to maintain a fluid-tight engagement with the abutment so that the entire assembly provides a sealing action along the shaft and against the housing wall.

The flexible operating sleeves 40 and 41 coact as a unit with the retaining members 30 and 31 in the assembly and the frictional relationships throughout the assembly are such that the driving sleeve 20 and the coupling member 25 rotate with the shaft while the intermediate sub-assembly of the operating sleeves and retaining members rotate between the fixed abutment 16 and the coupling member 25 at a reduced speed which approaches one-half the shaft speed. In this respect the retaining member 30 is the ultimate driven member in the assembly. This operation results in lower operating temperatures at the contact faces between the retaining members and the abutment and coupling member against which they coact. This feature together with the temperature resistant metallic tension sleeves is particularly suitable for sealing a rotary shaft from a fluid housing in high temperature environments.

The assembly is simple in construction and involves a minimum number of relatively movable parts which may be readily assembled and which minimize the effective displacement and wear forces normally resulting from movement of the rotating shaft. The resiliently flexible sleeves which coact in the assembly as operating members to initiate and maintain the sealing action are sufficiently rugged to withstand extreme operating conditions and particularly the adverse effects of high temperature environments.

I have shown and described what I consider to be the preferred embodiment of my invention, along with similar modified forms and suggestions, and it will be obvious to those skilled in the art, that other changes and modifications may be made without departing from the scope of my invention as described and defined by the appended claims.

I claim:

1. In a tension device for a rotary shaft seal having sealing members axially spaced on the shaft and capable of coaction against a shaft and fluid housing abutment respectively to affect a seal therewith under the influence of axial tension between the members, a tension device including a pair of bell-shaped sleeves each having an axially concave surface defining dissimilar diameters at their respective ends, the axially concave surface of each sleeve being capable of resilient flexure under compression at the ends of each sleeve, said sleeves coacting about the shaft between the sealing members in compressed telescoping relation at their small diameter ends to exert an axial tension against the sealing members for effecting a fluid seal along the shaft.

2. A fluid seal for a rotary shaft comprising in combination, a fixed abutment defining a portion of a fluid chamber and having an opening through which the shaft extends, a radially flexible abutment loosely disposed about the shaft in axially spaced relation from the fixed abutment, means for clamping said flexible abutment against the shaft in response to an axial force acting thereon, a pair of annular members freely surrounding the shaft between the abutments and each adapted to be urged respectively in opposite axial directions against the fixed abutment and the clamping means, and a pair of resiliently flexible sleeves freely surrounding the shaft and coacting in axially compressed relation between said annular members to exert an axial force in opposite directions against the respective annular members and thereby provide a fluid seal between the shaft extension and the fluid chamber.

3. The fluid seal of claim 2 wherein each resiliently flexible sleeve is bell-shaped and has an axial surface defining dissimilar diameters at the respective ends, said sleeves coacting with the small diameter ends in telescoping relation and their large diameter ends engaging the adjacent annular members.

4. The fluid seal of claim 2 wherein each resiliently flexible sleeve is bell-shaped and has an axially concave side wall defining dissimilar diameters at the respective ends, said sleeves coacting with their small diameter ends in telescoping relation and their large diameter ends engaging the adjacent annular members, and each annular member having retaining means for maintaining the engagement with the large diameter end of the corresponding sleeve.

5. A fluid seal for a rotary shaft comprising in combination, a fixed abutment defining a portion of a fluid chamber and having an opening through which the shaft extends, a radially flexible abutment loosely disposed about the shaft in axially spaced relation from the fixed abutment and having an axially tapered external surface, an annular clamping member freely surrounding the shaft and having a mating axially tapered inner surface adapted to coact in wedging relation against the tapered surface of said radially flexible abutment in response to an axial force acting thereon, a pair of annular members freely surrounding the shaft and each adapted to be urged respectively in opposite axial directions against the abutment and the clamping member, and a pair of resiliently flexible sleeves freely surrounding the shaft and coacting in axially compressed relation between said annular members to exert an axial force in opposite directions against the respective annular members and thereby provide a fluid seal between the shaft extension and the fluid chamber.

6. In a fluid seal for a shaft rotatably extending from a fluid housing through a fixed abutment the combination of, a radially flexible abutment loosely disposed about the shaft in axially spaced relation from the fixed abutment, means surrounding the shaft and adapted to coact in wedging relation against the flexible abutment to clamp said flexible abutment against the shaft in response to an axial force acting thereon, a pair of annular members freely surrounding the shaft between the abutments and each adapted to be urged respectively in opposite axial directions against the fixed abutment and the clamping means, and a pair of thin resilient metal sleeves freely surrounding the shaft between said annular members and coacting in axially compressed relation to exert an axial force in opposite directions against the respective annular members and thereby provide a fluid seal along the shaft.

References Cited in the file of this patent

UNITED STATES PATENTS

| 772,640 | Benson | Oct. 18, 1904 |
| 1,767,413 | Spreen | June 24, 1930 |
| 2,089,570 | Petrelli | Aug. 10, 1937 |
| 2,316,059 | Fretter | Apr. 6, 1943 |
| 2,429,953 | Bottomley | Oct. 28, 1947 |
| 2,554,595 | Smith | May 29, 1951 |
| 2,586,739 | Summers | Feb. 19, 1952 |

FOREIGN PATENTS

| 462,424 | France | Nov. 22, 1913 |